United States Patent
Takebe

(10) Patent No.: US 9,020,916 B2
(45) Date of Patent: Apr. 28, 2015

(54) DATABASE SERVER APPARATUS, METHOD FOR UPDATING DATABASE, AND RECORDING MEDIUM FOR DATABASE UPDATE PROGRAM

(75) Inventor: Nobuyuki Takebe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 401 days.

(21) Appl. No.: 13/298,859

(22) Filed: Nov. 17, 2011

(65) Prior Publication Data

US 2012/0191679 A1 Jul. 26, 2012

(30) Foreign Application Priority Data

Jan. 25, 2011 (JP) ................................. 2011-013476

(51) Int. Cl.
   *G06F 17/30* (2006.01)
(52) U.S. Cl.
   CPC ............................... *G06F 17/30377* (2013.01)
(58) Field of Classification Search
   CPC ................. G06F 17/30359; Y10S 707/99938; H04L 63/068
   USPC ..................................... 707/609, 703; 714/19
   See application file for complete search history.

(56) References Cited

U.S. PATENT DOCUMENTS

| | | | |
|---|---|---|---|
| 6,332,160 B1 | 12/2001 | Tabuchi | |
| 2005/0028026 A1* | 2/2005 | Shirley et al. | 714/6 |
| 2006/0085672 A1* | 4/2006 | Watanabe et al. | 714/6 |
| 2008/0077591 A1* | 3/2008 | Gupta et al. | 707/8 |
| 2008/0098045 A1* | 4/2008 | Radhakrishnan et al. | 707/203 |
| 2009/0254610 A1* | 10/2009 | Arthursson | 709/203 |
| 2009/0287703 A1* | 11/2009 | Furuya | 707/8 |
| 2012/0005530 A1* | 1/2012 | Marathe et al. | 714/19 |

FOREIGN PATENT DOCUMENTS

| | | |
|---|---|---|
| JP | 11-024973 | 1/1999 |
| JP | 2009-271665 | 11/2009 |

OTHER PUBLICATIONS

"Distributed System", published in Japanese, translated by Mizuno et al., Denkishoin co., Ltd., 2nd Edition, pp. 764-777, Oct. 31, 1997.
Japanese Office Action dated Apr. 30, 2014 in corresponding Japanese Patent Application No. 2011-013476.

* cited by examiner

*Primary Examiner* — Dinku Gebresenbet
(74) *Attorney, Agent, or Firm* — Staas & Halsey LLP

(57) ABSTRACT

A database server apparatus including: a data storage unit configured to store data; a committing procedure information storage unit configured to store committing procedure information for committing each of a plurality of transactions that updates data stored in the data storage unit; a data creating unit configured to create yet-to-be-committed update data from the stored data by executing a transaction for updating the data upon receipt of the transaction; a determining unit configured to determine whether there is a committed transaction that creates committed data as source update data before the transaction executed by the data creating unit is committed; and a committing unit configured to commit the transaction for re-updating the yet-to-be-committed update data in accordance with the committed data and the committing procedure information, when the determining unit determines that there is the committed transaction.

9 Claims, 12 Drawing Sheets

| COLUMN NAME | COLUMN DATA TYPE | DEFAULT VALUE | COLUMN RESTRICTION INFORMATION | ATTRIBUTE IN CONFLICTING UPDATE |
|---|---|---|---|---|
| COLUMN 1 | Integer | 0 | NOT NULL | Conflicting Operation Max |
| COLUMN 2 | Char(1) | – | – | Conflicting Operation OverWrite |
| COLUMN 3 | Char(5) | – | – | Conflicting Operation OverWrite |
| COLUMN 4 | Integer | – | – | Conflicting Operation Merge |

FIG. 5

| RECORD ID | CREATOR ID | UPDATER ID | COMMITMENT TIME | GENERATION POINTER | UPDATE FLAG 1 | COLUMN 1 | UPDATE FLAG 2 | COLUMN 2 | UPDATE FLAG 3 | COLUMN 3 | UPDATE FLAG 4 | COLUMN 4 |
|---|---|---|---|---|---|---|---|---|---|---|---|---|
| R2 | 10 | - | 10:00 | - | y | 100 | y | A | y | Init | y | 5000 |
| R4 | 10 | - | 10:00 | - | y | 30 | y | F | y | Init | y | 3200 |
| R6 | 40 | - | - | - | n | 100 | y | B | n | Init | y | 4000 |
| R7 | 50 | - | - | - | y | 20 | y | C | y | Init | y | 450 |
| R8 | 50 | - | - | - | n | 100 | n | A | y | Upd | y | 4000 |
| R9 | 50 | 50 | - | - | y | - | y | - | y | - | y | - |

FIG. 6

| TRANSACTION ID | SOURCE UPDATE RECORD ID | CREATED RECORD ID | PROCESS |
|---|---|---|---|
| 40 | R2 | R6 | UPDATE |
| 50 | – | R7 | ADDITION |
| 50 | R2 | R8 | UPDATE |
| 50 | R4 | R9 | DELETION |

FIG. 7A

```
Insert into SCM1. TBL1 Values
(100, A, Init, 5000, ··· )
Commit
```

FIG. 7B

```
Update SCM1. TBL1
Set Column2='B', Column4=Column4-1000
WHERE Column1=100
```

FIG. 7C

```
Update SCM1. TBL1
Set Column3='Upd', Column4=Column4-1000
WHERE Column1=100
```

FIG. 8

| RECORD ID | CREATOR ID | UPDATER ID | COMMITMENT TIME | GENERATION POINTER | UPDATE FLAG1 | COLUMN 1 | UPDATE FLAG2 | COLUMN 2 | UPDATE FLAG3 | COLUMN 3 | UPDATE FLAG4 | COLUMN 4 |
|---|---|---|---|---|---|---|---|---|---|---|---|---|
| R2 | 10 | 40 | 10:00 | R6 | y | 100 | y | A | y | Init | y | 5000 |
| R6 | 40 | 50 | 13:00 | R8 | n | 100 | y | B | n | Init | y | 4000 |
| R8 | 50 | — | 13:07 | — | n | 100 | n | A → B | y | Upd | y | 4000 → 3000 |

FIG. 9

| RECORD ID | CREATOR ID | UPDATER ID | COMMITMENT TIME | GENERATION POINTER | UPDATE FLAG 1 | COLUMN 1 | UPDATE FLAG 2 | COLUMN 2 | UPDATE FLAG 3 | COLUMN 3 | UPDATE FLAG 4 | COLUMN 4 |
|---|---|---|---|---|---|---|---|---|---|---|---|---|
| R2 | 10 | 40 | 10:00 | R6 | y | 100 | y | A | y | Init | y | 5000 |
| R4 | 10 | 50 | 10:00 | R9 | y | 30 | y | F | y | Init | y | 3200 |
| R6 | 40 | 50 | 13:00 | R8 | n | 100 | y | B | n | Init | y | 4000 |
| R7 | 50 | - | 13:02 | - | y | 20 | y | C | y | Init | y | 450 |
| R8 | 50 | - | 13:07 | - | n | 100 | n | B | y | Upd | y | 3000 |
| R9 | 50 | 50 | 13:09 | - | y | - | y | - | y | - | y | - |

FIG. 12

| RECORD ID | CREATOR ID | UPDATER ID | ID:40 Visible | ID:50 Visible |
|---|---|---|---|---|
| R1 | 10 | | Visible | Visible |
| R2 | 10 | | | |
| R3 | 10 | 80 | | |
| R4 | 20 | | Visible | |
| R5 | 30 | 110 | Visible | Visible |
| R6 | 40 | | Visible | |
| R7 | 50 | | | Visible |
| R8 | 50 | | | Visible |
| R9 | 50 | | | Visible |
| R10 | 110 | | | |
| R11 | 110 | | | |

DATABASE SERVER APPARATUS, METHOD FOR UPDATING DATABASE, AND RECORDING MEDIUM FOR DATABASE UPDATE PROGRAM

CROSS-REFERENCE TO RELATED APPLICATION

This application is based upon and claims the benefit of priority of the prior Japanese Patent Application No. 2011-13476, filed on Jan. 25, 2011, the entire contents of which are incorporated herein by reference.

FIELD

The present invention relates to a database server apparatus, a method for updating database, and a recording medium for a database update program.

BACKGROUND

Conventional database servers receive transactions from user terminals. Upon receipt of a transaction, the database server carries out various processes; for example, it adds, reads out, updates, and deletes data. If this type of database server concurrently receives transactions that attempt to update the same data from a plurality of users, the database server performs exclusive control, such as a lock method etc., on various processes to assure the integrity of the data.

Specifically, to assure data integrity, the database server exclusively controls transactions that attempt to update the same data with conflicting transactions. For example, the database server uses pessimistic lock, optimistic lock, or another type of exclusive control etc.

Pessimistic lock is a method that assumes that transactions attempting to update data in a database are highly likely to be received at the same time from a plurality of users. Once a transaction reads out data to be updated, the other transactions are excluded.

Optimistic lock is a method that assumes that transactions attempting to update data in a database are less likely to be received at the same time from a plurality of users. Once a transaction reads out data to be updated, if another transaction attempts to update and commit the data before the transaction completes the update of the data, the other transaction is treated to be invalid.

As described above, to assure data integrity, a database server uses pessimistic lock, optimistic lock, or another type of exclusive control to process conflicting transactions in succession while excluding the other transactions.

Technology that enables a database server to process a plurality of transactions together is also disclosed. For example, the database server combines transactions entered in a certain period of time and recombines the transactions for each data to be read out and updated by transactions to determine their execution order, before the database server executes the transactions.

However, the above conventional technology is problematic in that conflicting transactions cannot be executed at the same time. For example, a database server that uses exclusive control executes conflicting transactions in succession to assure data integrity, so the database server cannot execute the conflicting transactions at the same time.

In the method in which a plurality of transactions are processed together, if the database server executes a transaction that determines a branch instruction, for example, the database server determines a condition from a result obtained by searching the transaction for data before executing a next process, so the database server cannot send all processes executed in the transaction to a database in advance. It is difficult and is not practical to consider, during the design of an application, updates carried out by other transaction to be executed at the same time and design execution of the transactions.

Japanese Laid-open Patent Publication No. 2009-271665 is an example of related art.

SUMMARY

According to an aspect of the embodiments, a database server apparatus including: a data storage unit configured to store data; a committing procedure information storage unit configured to store committing procedure information for committing each of a plurality of transactions that updates data stored in the data storage unit; a data creating unit configured to create yet-to-be-committed update data from the stored data by executing a transaction for updating the data upon receipt of the transaction; a determining unit configured to determine whether there is a committed transaction that creates committed data as source update data before the transaction executed by the data creating unit is committed; and a committing unit configured to commit the transaction for re-updating the yet-to-be-committed update data in accordance with the committed data and the committing procedure information, when the determining unit determines that there is the committed transaction.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 illustrates an example of information stored as a table TBL1 in a database.

FIG. 6 illustrates an example of a record set of transactions stored in the database buffer.

FIG. 7A illustrates an example of SQL statements generated by a database operating unit as an access procedure.

FIG. 7B illustrates another example of SQL statements generated by the database operating unit as the access procedure.

FIG. 7C illustrates still another example of SQL statements generated by the database manipulating part as the access procedure.

FIG. 8 illustrates data committing by an update committing part.

FIG. 9 illustrates an example of the state of the database after the update committing part has committed a transaction.

FIG. 12 illustrates record ID for each transaction that was determined to be visible by a record manipulating part.

DESCRIPTION OF EMBODIMENTS

Embodiments of a database server apparatus, a method for updating database, and a recording medium for a database update program in this disclosure will be described in detail with reference to the drawings. It should be understood that these embodiments do not limit the disclosure.

First Embodiment

Figure 1:
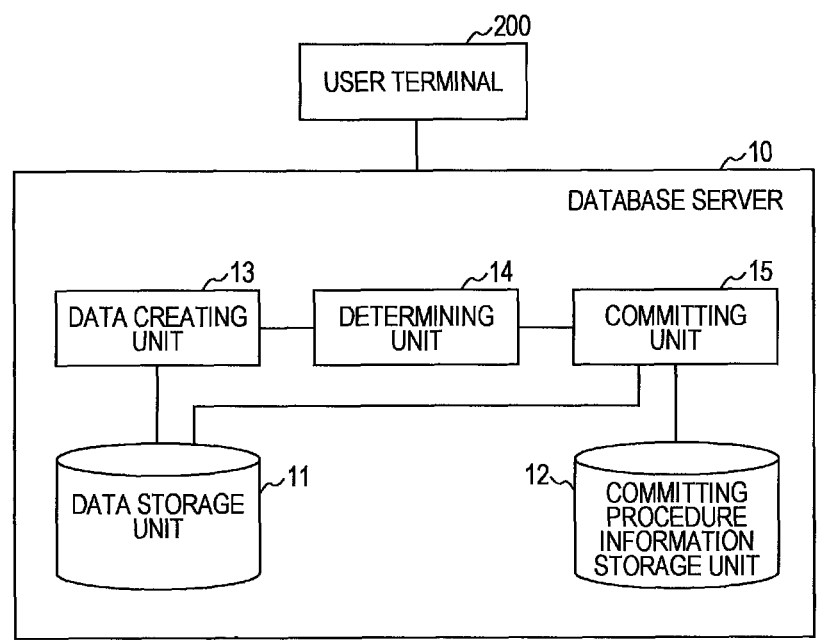
FIG. 1 is a block diagram illustrating the structure of a database server according to a first embodiment.

FIG. 1 is a block diagram illustrating the structure of a database server 10 according to a first embodiment. The database server 10 in FIG. 1 has a data storage unit 11, a committing procedure information storage unit 12, a data creating unit 13, a determining unit 14, and a committing unit 15. The database server 10 receives transactions that perform various processes for searching, adding, updating, and deleting data from a user terminal 200 that is connected to the database server 10 through a network.

The data storage unit 11 stores data. The committing procedure information storage unit 12 stores committing procedure information used to commit a plurality of transactions that update data to be stored in the data storage unit 11.

When the data creating unit 13 receives a transaction that updates data, the data creating unit 13 executes the transaction and creates yet-to-be-committed update data from the data. The determining unit 14 determines whether there is a committed transaction that created committed data by using the data as source update data before the transaction executed by the data creating unit 13 is committed. If the determining unit 14 determines that there is such a committed transaction, the committing unit 15 re-updates the yet-to-be-committed update data according to the committed data and committing procedure information and commits the transaction.

The data creating unit 13 updates new data for each transaction. If there is a transaction that created other new data from the same data, the committing unit 15 commits the transaction and another transaction according to the committing procedure information. Therefore, the database server 10 according to the first embodiment can concurrently execute conflicting transactions while maintaining high data integrity.

Second Embodiment

Figure 2:
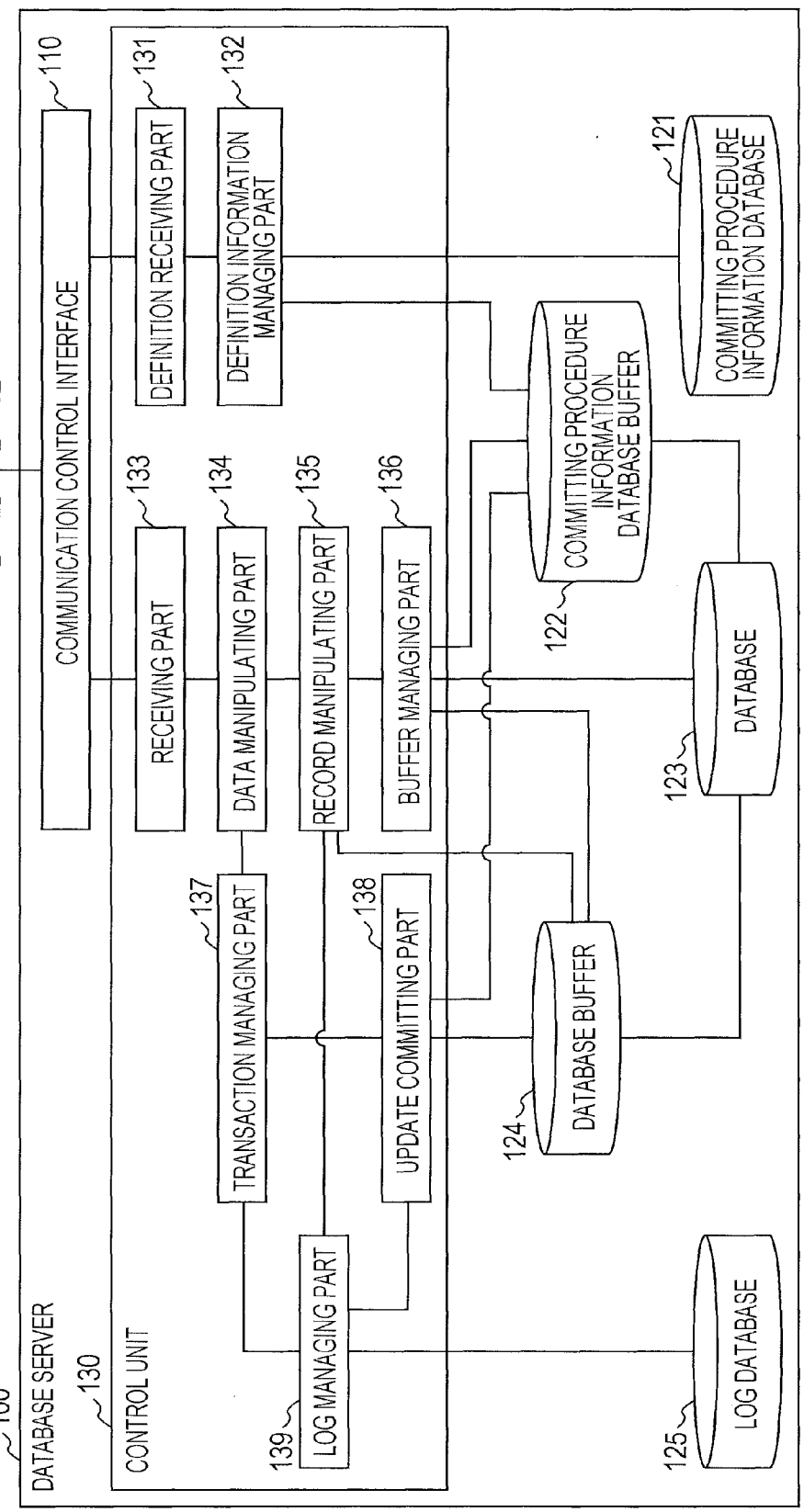
FIG. 2 is a block diagram illustrating the structure of a database server according to a second embodiment.

The structure of a database server according to a second embodiment will be described next. FIG. 2 is a block diagram illustrating the structure of the database server 100 according to the second embodiment. The database server 100 according to the second embodiment in FIG. 2 has a communication control interface 110, a committing procedure information database 121, a committing procedure information database buffer 122, a database 123, a database buffer 124, a log database 125, and a control unit 130. The database server 100 receives transactions that perform various processes for searching, adding, updating, and deleting data from the user terminal 200 that is connected to the database server 100 through a network. The committing procedure information database 121, committing procedure information database buffer 122, database 123, database buffer 124, and log database 125 are storage units such as semiconductor memory devices or hard disk drives.

The communication control interface 110, which has at least one communication port, controls information transmitted to and from another device. For example, the communication control interface 110 receives a transaction that references data stored in the database 123 from the user terminal 200, and outputs information from the database 123. The communication control interface 110 also outputs various types of information stored in the committing procedure information database 121, the log database 125, and the like to a management device (not illustrated) in response to its request.

Figures 3, 4:
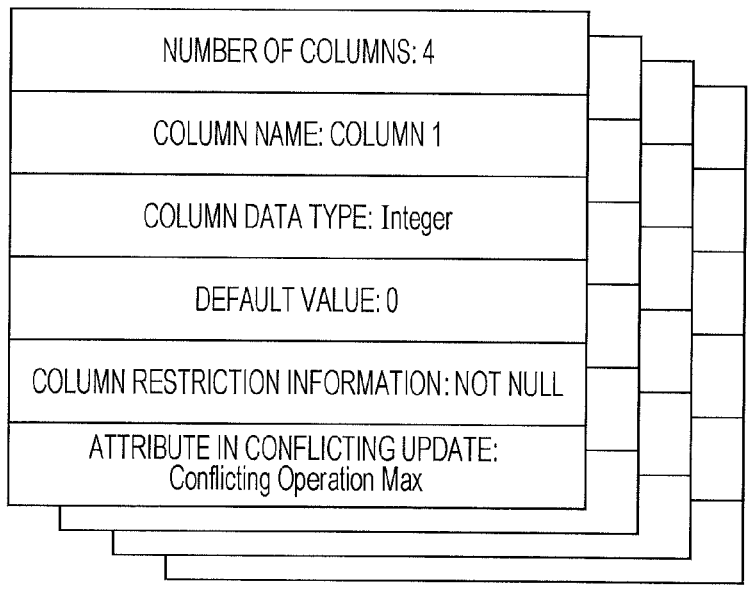
FIG. 3 illustrates an example of information stored in a committing procedure information database.
FIG. 4 illustrates an example of information stored in a committing procedure information database buffer.

The committing procedure information database 121 stores committing procedure information used to commit a plurality of transactions that update data in a database, for each data item in a table in the database. FIG. 3 illustrates an example of information stored in the committing procedure information database 121. For example, the committing procedure information database 121 in FIG. 3 respectively stores "column 1, Integer, 0, NOT NULL, Conflicting Operation Max" as a column name, a column data type, a default value, column restriction information, and an attribute in conflicting update. Similarly, the committing procedure information database 121 stores "column 2, Char (1), -, -, Conflicting Operation OverWrite", "column 3, Char (5), -, -, Conflicting Operation OverWrite", and "column 4, Integer, -, -, Conflicting Operation Merge".

The column name indicates the column name of a data item; for example, column 1, column 2, column 3, column 4, and so on are stored. The column data type indicates information that specifies the type of a value to be stored; for example, Integer that defines an integer, Char that defines a character string including as many characters as up to the specified number of characters, and the like are stored.

The default value indicates an initial value that is set in correspondence to the column data type if NOT NULL, described later, is defined as the column restriction information. If the column data type is Integer, for example, 0 is stored as the default value. The column restriction information indicates information about restrictions defined so that invalid data is not entered in the database. For example, NOT NULL that inhibits an input of a NULL value is stored as the column restriction information.

The attribute in conflicting update indicates committing procedure information according to which each transaction is committed if a conflict occurs among transactions. For example, Merge, which calculates a difference between update results, OverWrite, which carries out an overwrite with a result having a later commitment time, Max, which sets a larger value, Min, which sets a smaller value, and the like are stored as attributes in the case of an update conflict. If an update has been carried out by another transaction, Error, which sets the transaction as an invalid transaction, Function, which calls a user-defined function and carries out a merge according to a user theory, and the like are stored as attributes in the case of an update conflict. The attributes in the case of an update conflict will be described later in detail.

In column 1 in the committing procedure information database 121 in the example illustrated in FIG. 3, an integer at a precision without decimal places is stored, and 0 is set as the initial value because the NOT NULL restriction is defined. If column 1 causes a data update conflict, a larger value is set. Similarly, in column 2, a character string including one character or less is stored. If a data update conflict occurs, overwrite is carried out with a later result having a commitment time. In column 3, a character string including five characters or less is stored. If a data update conflict occurs, overwrite is carried out with a later result having a commitment time. In column 4, an integer at a precision without decimal places is stored. If a data update conflict occurs, a value obtained by manipulating a difference is set.

The committing procedure information database buffer 122 temporarily stores part or the whole of information to be stored in the committing procedure information database 121. FIG. 4 illustrates an example of information stored in the committing procedure information database buffer 122. For example, the committing procedure information database buffer 122 in FIG. 4 stores the number of columns as well as a column name, a column data type, a default value, a column restriction information, and an attribute in conflicting update for each column. The number of columns is a count of columns. The column name, column data type, default value, column restriction information, and attribute in conflicting update are the same as in the committing procedure information database 121, so their detailed description will be omitted.

The database 123 stores various types of information as a record including a plurality of data items. FIG. 5 illustrates an example of information stored as a table TBL1 in the database 123. For example, the database 123 in FIG. 5 stores a record ID, a creator ID, an updater ID, a commitment time, a generation pointer, update flag 1, column 1, update flag 2, column 2, update flag 3, column 3, update flag 4, and column 4 in correspondence with one another.

The record ID is an identifier that uniquely identifies a record; for example, R2 is stored. The creator ID is an identifier that uniquely identifies a creator that created a record or a transaction; for example, 10 is stored. When a transaction that adds, updates, or deletes a record is executed, the identifier that identifies the transaction is stored as the updater ID. Therefore, a record that includes an updater ID indicates that the record was made invalid because, for example, the transaction indicated by the identifier replaced the record with an updated record or deleted the record. When a transaction that deletes a record is executed, the value of the identifier that identifies the same transaction as the creator ID is stored as the updater ID. The commitment time is time information that indicates a time of day at which the transaction was terminated; for example, 10:00 is stored. The generation pointer indicates the record ID of a record that was created as a new record by an update.

Column 1, column 2, column 3, and column 4 indicate data values that were set according to the column data type in the committing procedure information stored in the committing procedure information database 121; for example, 100, A, Init, and 5000 are respectively stored.

Update flag 1 indicates that information in column 1 was created by being updated. If, for example, a value in column 1 is an updated value, "y" is stored in column 1. If the value in update flag 1 is a non-updated value, "n" is stored in update flag 1; this means that when the record was updated, the column inherited the source update value without being updated. Update flag 2, update flag 3, and update flag 4 are also used in the same way as update flag 1, so their detailed description will be omitted.

The database 123 in the example in FIG. 5 indicates that a record identified by a record ID of R2 has data values 100, A, Init, and 5000, which were created by a transaction identified by a creator ID of 10 at 10:00 and that all data values were newly created and committed. The database 123 similarly indicates that a record identified by a record ID of R4 has data values 30, F, Init, and 3200, which were created by the transaction identified by a creator ID of 10 at 10:00 and that all data values were newly created and committed.

The database 123 also indicates that a record identified by a record ID of R6 has data values 100, B, Init, and 4000, of which the values in columns 2 and 4 were updated by a transaction identified by a creator ID of 40. The database 123 also indicates that a record identified by a record ID of R7 has data values 20, C, Init, and 450, which were updated by a transaction identified by a creator ID of 50 in columns 1 to 4.

The database 123 also indicates that a record identified by a record ID of R8 has data values 100, A, Upd, and 4000, of which the values in columns 3 and 4 were updated by the transaction identified by a creator ID of 50. The database 123 also indicates that since the creator ID and updater ID in the record identified by the record ID of R9 are both 50, the record was created by the transaction identified by 50 and any other record was deleted.

The database buffer 124 temporarily stores copies of records to be updated, which are included in the information to be stored in the database 123, and also temporarily stores the updated records, which were created from the copies of the records. Information stored in the database buffer 124 is the same as information stored in the database 123, an example of which is illustrated in FIG. 5, so its description will be omitted.

The database buffer 124 also stores the address of a record used as a source of an update or deletion and the address of a record created due to the update or the deletion and an addition as a record set. FIG. 6 illustrates an example of a record set of transactions stored in the database buffer. For example, as illustrated in FIG. 6, the database buffer 124 stores a transaction ID, a source update record ID, a created record ID, and a process while associating them with one another.

The transaction ID is an identifier that identifies a transaction; for example, 40 is stored. The source update record ID is an identifier that uniquely identifies a record that was used as a source of an update or deletion; for example, R2 is stored. The created record ID is an identifier that uniquely identifies a record that was created due to the update or the deletion and an addition; for example, R6 is stored. That is, the process indicates the type of a transaction, whether the transaction adds, updates, or deletes a record; for example, "update" is stored.

The database buffer 124 in the example in FIG. 6 indicates that the transaction identified by a transaction ID of 40 updated the source update record identified by a source update record ID of R2 and created the record identified by a created record ID of R6. The database buffer 124 also indicates that the transaction identified by a transaction ID of 50 added the record identified by a created record ID of R7. The database buffer 124 also indicates that the transaction identified by a transaction ID of 50 updated the source update record identified by a source update record ID of R2 and created the record identified by a created record ID of R8. Similarly, the database buffer 124 indicates that the transaction identified by a transaction ID of 50 deleted the source update record identified by a source update record ID of R4 and created the record identified by a created record ID of R9.

The log database 125 stores update history information of transactions. The information is used to invalidate updated data when a transaction is rolled back and to recover the database to the newest state when the system goes down.

The control unit 130 has an internal memory in which programs describing various processing procedures and necessary data are stored. The control unit 130 also has a definition receiving part 131, a definition information managing part 132, an receiving part 133, a data manipulating part 134, a record manipulating part 135, a buffer managing part 136, a transaction managing part 137, an update committing part 138, and a log managing part 139. For example, the control unit 130 is an integrated circuit such as an application specific integrated circuit (ASIC), a field programmable gate array (FPGA), a central processing unit (CPU), or a micro processing unit (MPU).

The definition receiving part 131 receives a database resource definition from a user. The definition receiving part 131 also receives committing procedure information in which an attribute used at the time of an update conflict in each data item is specified in each column. For example, the definition receiving part 131 receives Merge, Overwrite, Max, Min, Error, and Function from the user.

The definition information managing part 132 stores the database definition information, which is received by the definition receiving part 131 from the user, in the committing procedure information database 121. The definition information managing part 132 also reads out the committing procedure information from the committing procedure information database 121 and stores the read-out committing procedure information in the committing procedure information database buffer 122. For example, the definition information managing part 132 reads out the information illustrated in FIG. 3, which is stored in the committing procedure information database 121, and stores the read information in the committing procedure information database buffer 122 as illustrated in FIG. 4.

The receiving part 133 receives a database manipulation from the user terminal 200. For example, the receiving part 133 receives a reference or update of the database or a start or termination of a transaction and transfers the received manipulation to the data manipulating part 134. Upon receipt of a process to commit a transaction from the user terminal 200, the receiving part 133 notifies the data manipulating part 134.

The data manipulating part 134 interprets a database manipulation received from the user terminal 200 through the receiving part 133 as a database manipulating instruction. Upon receipt a transaction start or termination from the receiving part 133, for example, the data manipulating part 134 interprets the received start or termination and notifies the transaction managing part 137.

The data manipulating part 134 also creates a procedure for accessing the transaction received from the user terminal 200. For example, the data manipulating part 134 creates a procedure for accessing the database 123 with reference to data manipulating instructions (SQL) and definition information, which are received by the receiving part 133. How an access of the data manipulating part 134 to the database is determined will be described with reference to FIGS. 7A to 7C.

The SQL statements in FIG. 7A, for example, are entered from the user terminal, which create a procedure so that the data manipulating part 134 accesses the database 123 and adds "100, A, Init, 5000, . . ." as a record in the table TBL1 to be stored in the database 123.

The SQL statements in FIG. 7B create a procedure so that the data manipulating part 134 accesses the database 123 and updates the value in column 2 in the record "100, A, Init, 5000, . . ." stored in the database 123 to B and the value in column 4 to "1000 less than the value in column 4".

The SQL statements in FIG. 7C create a procedure so that the data manipulating part 134 accesses the database 123 and updates the value in column 3 in the record "100, A, Init, 5000, . . ." stored in the database 123 to Upd and the value in column 4 to "1000 less than the value in column 4".

The data manipulating part 134 transfers the created access procedure to the record manipulating part 135 to have it search for data and update the data. The data manipulating part 134 stores an isolation level at which the transaction is executed, and notifies the record manipulating part 135 which committed data, the transaction start time or the data manipulation instruction execution time, is searched for during a data search.

The record manipulating part 135 searches and updates the database, terminates transactions, and records logs. The record manipulating part 135 is an example of the data creating unit 13 in the first embodiment. That is, when the record manipulating part 135 receives a transaction that updates data, it executes the transaction and creates yet-to-be-committed update data from the data.

Upon receipt of a database search from the data manipulating part 134, the record manipulating part 135 calls the buffer managing part 136 to read out a record from the database 123 and store the read-out data in the database buffer 124. The record manipulating part 135 also searches the database 123 according to a procedure commanded by the data manipulating part 134 and returns the record.

When the record manipulating part 135 receives SQL statements from the data manipulating part 134, it updates data. The record manipulating part 135 creates a new record each time it updates data and does not lock resources during record reference. Even if the same record is updated, therefore, the record manipulating part 135 carries out a reference process without an exclusive wait. The record manipulating part 135 also notifies the buffer managing part 136 to acquire the database buffer 124.

When adding data, for example, the record manipulating part 135 adds a record to the database buffer 124. The record manipulating part 135 also stores 'y' in an update flag so that the column in the record, data in which has been updated, is identified. An example will be described with reference again to FIGS. 5 and 7A. When the record manipulating part 135 receives the SQL statements in FIG. 7A from the data manipulating part 134, the record manipulating part 135 creates the record identified by a record ID of R2, which is illustrated in FIG. 5.

When updating data, for example, the record manipulating part 135 copies the relevant source update record stored in the database buffer 124 and updates the copied record. The record manipulating part 135 stores 'y' in an update flag in the record so that the column in the record, data in which has been updated, is identified.

Another example will be described with reference again to FIGS. 5, 7B, and 7C. Upon receipt of the access procedure coded in SQL illustrated in FIG. 7B from the data manipulating part 134, the record manipulating part 135 creates the record identified by a record ID of R6, which is illustrated in FIG. 5. Similarly, upon receipt of the SQL statements illustrated in FIG. 7C from the data manipulating part 134, the record manipulating part 135 creates the record identified by a record ID of R8, which is illustrated in FIG. 5.

When deleting data, the record manipulating part 135 creates a record to be deleted in the database buffer 124 without directly deleting the data. An example will be described with reference again to FIG. 5. When deleting the record identified by a record ID of R4, the record manipulating part 135 creates a record identified by a record ID of R9 illustrated in FIG. 5 as a record to be deleted.

The record manipulating part 135 also stores, in the database buffer 124, a source update record that has been used for an update or a deletion and a created record that has been created due to the update or the deletion and an addition, as a record set updated by the transaction. An example will be described with reference again to FIG. 6. The record manipulating part 135 stores the address of a record that has been used as a source of an update or a deletion and the address of a record created due to the update or the deletion and an addition in the database buffer 124 as a record set illustrated in FIG. 6.

The record manipulating part 135 also notifies the log managing part 139 of a record image before an update and a record image after the update to record a log in the log database 125.

Referring again to FIG. 2, if data is not stored in the database buffer 124, the buffer managing part 136 reads out data stored in the database 123 and stores it in the database buffer 124. When, for example, modifying the record identified by a record ID of R2 to create the record identified by a record ID of R6, the buffer managing part 136 reads the record identified by a record ID of R2 from the database 123 and stores the read-out record in the database buffer 124.

The transaction managing part 137 manages transactions in an integrated manner. When, for example, committing a transaction, the transaction managing part 137 calls the update committing part 138 to merge an update result produced by the transaction to be committed and the latest update results produced by other transactions that have been executed concurrently with the transaction, according to a defined attribute in conflicting update. When a transaction is rolled back, the transaction managing part 137 recovers the result updated by the transaction to the data before the update.

Upon receipt of a notification from the transaction managing part 137, the update committing part 138 commits an added record created by the record manipulating part 135 or an updated record and then commits the transaction. A case in which the update committing part 138 commits an added record and a case in which the update committing part 138 commits an updated record will be described below in detail.

The update committing part 138 is an example of the determining unit 14 and committing unit 15 in the first embodiment. That is, when committing a transaction executed by the record manipulating part 135, the update committing part 138 determines whether there is a committed transaction that created committed data by using the data as the source update data. If the update committing part 138 determines that there is such a committed transaction, the update committing part 138 re-updates the yet-to-be-committed update data according to the committed data and committing procedure information and commits the transaction.

Here, a case in which the update committing part 138 commits an added record will be described. If there is no source update record corresponding to a record created by the record manipulating part 135, the update committing part 138 determines that the created record is an added record. After determining that the created record is an added record, the update committing part 138 commits the created record by storing a commitment time in the created record.

An example will be described with reference again to FIGS. 5 and 6. For the transactions identified by a transaction ID of 50 in the record set illustrated in FIG. 6, the record identified by a record ID of R7 does not have a source update record ID, so the update committing part 138 determines that there is no source update record. That is, the update committing part 138 determines that the record identified by a record ID of R7 is an added record. The update committing part 138 then stores 13:02 in the commitment time field of the record identified by a record ID of R7 in FIG. 5. The update committing part 138 commits the added record identified by a record ID of R7 in this way.

If there is a source update record corresponding to a created record, the update committing part 138 determines that the created record is an updated record and commits the updated record. When committing the updated record, the update committing part 138 determines whether there is a transaction that updates the same source update record.

Next, a case in which the update committing part 138 determines that there is no transaction that updates the same source update record will be described. To determine whether there is a committed transaction that updates the same source update record, the update committing part 138 reads out a source update record and determines whether a value is stored in the generation pointer in the read-out source update record. If the update committing part 138 determines that no value is stored in the generation pointer, then it determines that there is no committed transaction that updates the same source update record.

The update committing part 138 then selects the read-out source update record as a record at a reference generation. The update committing part 138 also excludes the committing of the selected reference-generation record at the reference generation. The update committing part 138 then stores a created record ID and updater ID in the reference-generation record. The update committing part 138 also stores a commitment time in the created record and commits the update.

An example will be described with reference again to FIGS. 5, 6, and 8, assuming that the transaction identified by a transaction ID of 40 and the transaction identified by a transaction ID of 50 each start a process at the same time and that the transaction identified by a transaction ID of 40 is first committed and then the transaction identified by a transaction ID of 50 is committed. The update committing part 138 determines that the transaction identified by a transaction ID of 40 in the record set illustrated in FIG. 6 created the record identified by a record ID of R6 by using the record identified by a record ID of R2 as the source update record.

When committing the transaction identified by a transaction ID of 40, the update committing part 138 determines that no value is stored in the generation pointer in the record identified by a record ID of R2, which is illustrated in FIG. 5. Therefore, the update committing part 138 determines that there is no committed record that updates the same source update record as the record identified by a record ID of R6. The update committing part 138 then stores R6 in the generation pointer in the record identified by a record ID of R2 and also stores 40 in the updater ID field, as illustrated in FIG. 8. The update committing part 138 then stores 13:00 in the commitment time field in the record identified by a record ID of R6 and commits the update. FIG. 8 illustrates data committing by the update committing part 138.

Furthermore, a case in which the update committing part 138 determines that there is a transaction that updates the same source update record will be described. The update committing part 138 reads out a source update record. If the update committing part 138 determines that a value is stored in the generation pointer in the read-out source update record, then it determines that there is a transaction that updates the same source update record. In this case, the update committing part 138 selects a reference generation, and commits the values stored in the created record according to the selected reference generation and the committing procedure information stored in the committing procedure information database buffer 122.

First, how the update committing part 138 selects a reference generation will be described. The update committing part 138 extracts the record ID stored in the generation pointer in the read-out source update record, and reads out a record identified by the extracted record ID. The record identified by the extracted record ID will be defined as the next-generation record.

The update committing part 138 then determines whether a value is stored in the generation pointer in the next-generation record. If the update committing part 138 determines that no value is stored in the generation pointer, then it selects the next-generation record as the reference-generation record. If the update committing part 138 determines that a value is stored in the generation pointer, it repeats the process to select a next-generation record, described above, until the update committing part 138 reads out a record in which no value is stored in the generation pointer. When the update committing part 138 selects the reference generation, it excludes the committing process for the selected reference generation.

An example will be described with reference again to FIG. 8, assuming that the transaction identified by a transaction ID of 40 is first committed and then the transaction identified by a transaction ID of 50 is committed. The update committing part 138 determines that the transaction identified by a transaction ID of 50 created the record identified by a record ID of R8 by using the record identified by a record ID of R2 as the source update record. Then, the update committing part 138 reads out the generation pointer in the record identified by a record ID of R2 and determines that R6 is stored in the generation pointer as illustrated in FIG. 8. Then, the update committing part 138 determines that there is a transaction that updates the same source update record.

Next, the update committing part 138 reads out the record identified by a record ID of R6 as the next-generation record and determines whether a value is stored in the generation pointer in that record. Since no value is stored in the generation pointer in the record identified by a record ID of R6, the update committing part 138 selects the record identified by a record ID of R6 as the reference-generation record of the record identified by a record ID of R8.

Furthermore, the update committing part 138 commits values stored in the created record according to the selected reference-generation record and the committing procedure information stored in the committing procedure information database buffer 122. For example, the update committing part 138 determines whether the value stored in an update flag is "y" or "n" to determine whether the value in the corresponding column was updated.

If the value stored in the update flag is "n", the update committing part 138 determines that the value stored in the column was not updated, and sets the value in the column in the reference-generation record. If the value stored in the update flag is "y", the update committing part 138 determines that the value stored in the column was updated, reads the committing procedure stored in the committing procedure information database buffer 122, and determines the attribute in conflicting update.

In the example in FIG. 8, since the values stored in update flag 1 and update flag 2 in the record identified by a record ID of R8 are both "n", the update committing part 138 sets 100 in column 1 and B in column 2. By contrast, since the values stored in update flag 3 and update flag 4 in the record identified by a record ID of R8 are both "y", the update committing part 138 determines the attribute in conflicting update, which is set for each column, from the committing procedure information, illustrated in FIG. 4, which is stored in the committing procedure information database buffer 122. The update committing part 138 then sets values in column 3 and column 4 according to the determined attributes in conflicting update.

Next, the update committing part 138 determines Merge, Max, Min, OverWrite, Error, or Function as the attribute in conflicting update, and sets a value in a column accordingly. The attributes in conflicting update determined by the update committing part 138 will be described below.

For example, the update committing part 138 determines that Merge is set for a column as the attribute in conflicting update, and sets a value obtained from a calculation between the updated difference and the value in the reference-generation record. For example, since the value of update flag 4 is "y" in the record identified by a record ID of R8 as illustrated in FIG. 8, the update committing part 138 determines that the value of the corresponding column was updated and reads out the committing procedure stored in the committing procedure information database buffer 122. Since Merge is set for column 4 as the attribute in conflicting update, the update committing part 138 stores 3000, which is obtained from a calculation between the difference and the value in column 4 in the record identified by a record ID of R6, which is the reference-generation record.

If the update committing part 138 determines Max is set for the column as the attribute in conflicting update, the update committing part 138 compares the updated value with the value in the reference-generation record and sets the maximum value. If the update committing part 138 determines Min is set for the column as the attribute in conflicting update, the update committing part 138 compares the updated value with the value in the reference-generation record and sets the minimum value.

If the update committing part 138 determines OverWrite is set for the column as the attribute in conflicting update, the update committing part 138 compares the commitment time in the updated record with the commitment time in the reference-generation record. If the commitment time in the updated record is earlier, the update committing part 138 sets the value stored in the reference-generation record. If the commitment time in the reference-generation record is earlier, the update committing part 138 sets the value stored in the updated record. In this case, the update committing part 138 determines the commitment time stored for each record.

For example, since the value of update flag 3 in the record identified by a record ID of R8, as illustrated in FIG. 8, is "y", the update committing part 138 determines that the value in column 3 was updated and reads out the committing procedure stored in the committing procedure information database buffer 122. Since OverWrite is set for column 3 as the attribute in conflicting update, the update committing part 138 compares the commitment time in the updated record identified by a record ID of R8 with the commitment time in the record identified by a record ID of R6, which is the reference-generation record. In this case, since the updated record identified by a record ID of R8 is earlier, the update committing part 138 stores Upd in column 3.

If the update committing part 138 determines that Error is set for the column as the attribute in conflicting update, the update committing part 138 determines whether the reference-generation record was updated. If the reference-generation record was updated, the update committing part 138 cancels the transaction.

If the update committing part 138 determines that Function is set for the column as the attribute in conflicting update, the update committing part 138 calls a user-registered function by using the source update record, reference-generation record, and added record as arguments to merge updated results. Function is a correction feature used in a case when results cannot be simply merged, for example, when document data are corrected by a plurality of users. Specifically, when the update committing part 138 adds the corrected document data, if another user already the added data, the update committing part 138 adds the corrected document data at the end of the original data.

When the update committing part 138 commits the update of a record, it stores the record ID of the created record and the updater ID in the reference-generation record. The update committing part 138 also stores the commitment time in the committed record. In the example in FIG. 8, when the update committing part 138 commits the update of the record identified by a record ID of R8, the update committing part 138 stores R8 in the generation pointer in the record identified by a record ID of R6, which is the reference-generation record, and stores 50 in the updater ID field. The update committing part 138 also stores 13:07 in the commitment time field of the record identified by a record ID of R8.

The update committing part 138 also determines whether all records, which are executed as a series of transactions, have been processed. If the update committing part 138 determines that all records have been processed, it cancels the exclusive control and commits the transaction.

When committing a transaction, the update committing part 138 transfers changes added to the database, that is, the recorded commitment time, the value stored in the generation pointer, and committed update results stored in columns in case of a transaction conflict to the log managing part 139.

An example of a database state after transactions were committed will be described with reference to FIG. 9. FIG. 9 illustrates an example of the state of the database after the update committing part 138 has committed a transaction. Unlike the example in FIG. 5, in the database after transactions were committed, which is illustrated in FIG. 9, the record identified by a record ID of R2 newly includes 40 in the updater ID field and R6 in the generation pointer. The record identified by a record ID of R4 newly includes 50 in the updater ID field and R9 in the generation pointer. The record identified by a record ID of R6 newly includes 50 in the updater ID field, 13:00 in the commitment time filed, and R8 in the generation pointer. The record identified by a record ID of R7 newly includes 13:02 in the commitment time filed. The record identified by a record ID of R8 newly includes 13:07 in the commitment time filed. In the record identified by a record ID of R8, the value in column 2 was updated to B and the value in column 4 was changed to 3000. The record identified by a record ID of R9 newly includes 13:09 in the commitment time filed.

The log managing part 139 stores the update information of a transaction in the log database 125. For example, the log managing part 139 receives a record image updated by the record manipulating part 135 and stores the received record image in the log database 125. The log managing part 139 also receives data after transaction committing from the update committing part 138 and stores the received record image in the log database 125. If the transaction managing part 137 determines that a transaction is rolled back, the log managing part 139 restores the result updated by the transaction to the data before the update.

Figure 10:
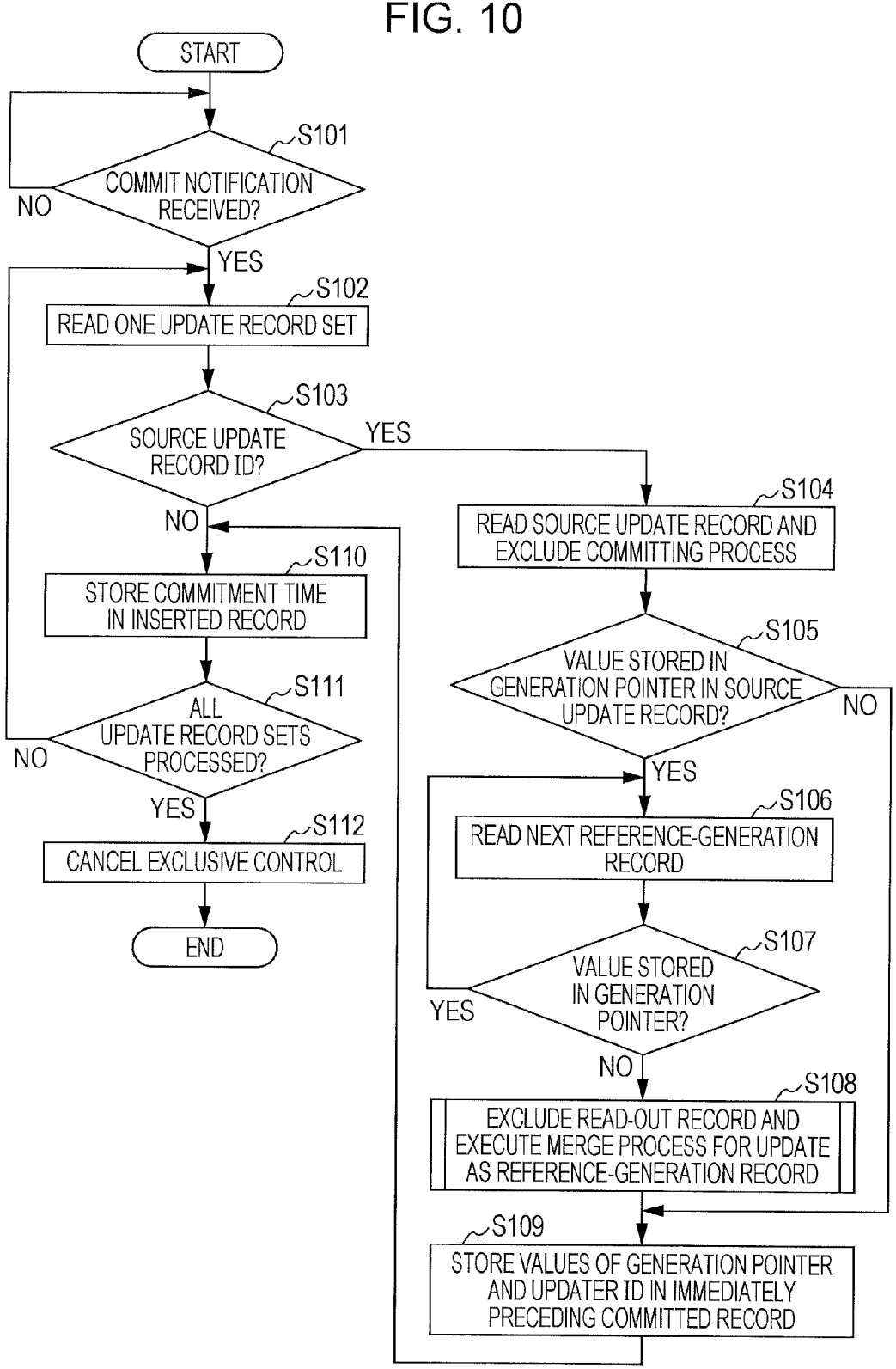
FIG. 10 is a flowchart illustrating a processing procedure executed by the update committing part.
Figure 11:
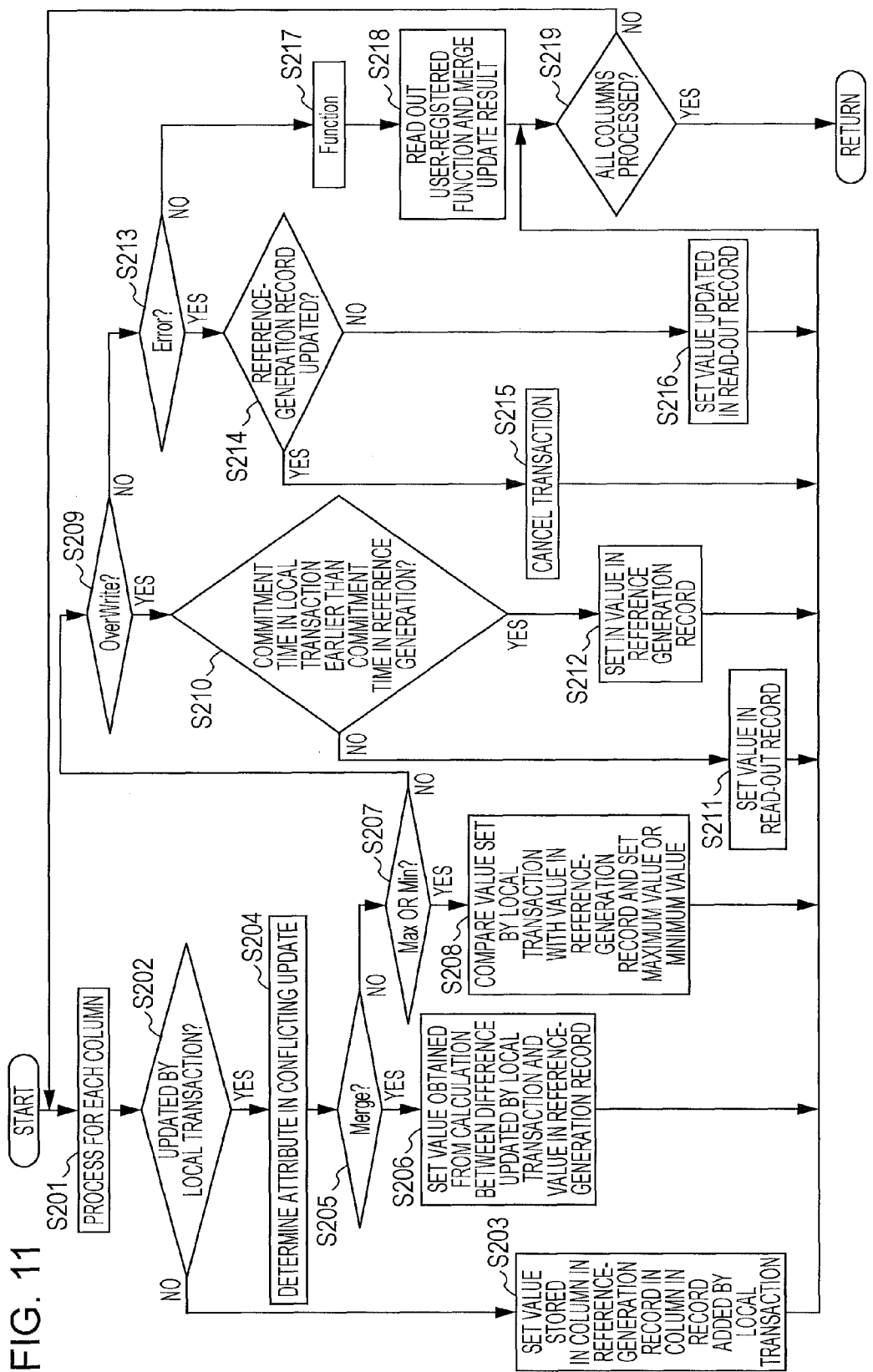
FIG. 11 is a flowchart illustrating a merging procedure.

Next, processing procedures executed by the database server 100 in the second embodiment will be described with reference to FIGS. 10 and 11. FIG. 10 illustrates a committing procedure executed by the update committing part 138 of the database server 100 in the second embodiment, and FIG. 11 illustrates a merging procedure executed by the update committing part 138.

FIG. 10 is a flowchart illustrating a processing procedure executed by the update committing part 138. A committing procedure executed by the update committing part 138 will be described with reference to FIG. 10. If the receiving part 133 receives a commit notification (the result in S101 is Yes), then the update committing part 138 reads out one update record set (S102). The update committing part 138 then determines whether the source update record ID of the read-out record is present (S103).

If the update committing part 138 determines that the source update record ID of the read-out record is present (the result in S103 is Yes), then the update committing part 138 excludes a committing process to be executed for the read-out record (S104). The update committing part 138 then determines whether a value is stored in the generation pointer in the source update record (S105).

If the update committing part 138 determines that no value is stored in the generation pointer (the result in S105 is No), then the update committing part 138 stores the values of the generation pointer and the updater ID in the immediately preceding committed record (S109), and execute a process in S110.

If the update committing part 138 determines that a value is stored in the generation pointer (the result in S105 is Yes), then the update committing part 138 reads out the record pointed to by the generation pointer and excludes a committing process to be executed for the read-out record (S106). The update committing part 138 then determines whether a value is stored in the generation pointer in the read-out record (S107). If the update committing part 138 determines that a value is stored in the generation pointer (the result in S107 is Yes), then the update committing part 138 returns to the process in step S106 and executes the subsequent processes.

If the update committing part 138 determines that no value is stored in the generation pointer (the result in S107 is No), then the update committing part 138 excludes the read-out record and executes a merge process for the update (S108). The update committing part 138 stores the values of the generation pointer and the updater ID in the immediately preceding committed record (S109), and executes a process in S110.

If the update committing part 138 determines that the source update record ID of the read-out record is not present (the result in S103 is No), then the update committing part 138 stores a commitment time in the created record (S110). The update committing part 138 then determines whether all update record sets have been processed (S111).

If the update committing part 138 determines that all update record sets have not been processed (the result in S111 is No), the update committing part 138 returns to the process in step S102 and executes subsequent processes. If the update committing part 138 determines that all update record sets have been processed (the result in S111 is Yes), the update committing part 138 cancels the exclusive control (S112) and terminates the processing procedure.

A merging procedure executed by the update committing part 138 will be described next with reference to FIG. 11. The merging procedure corresponds to S108 in FIG. 10.

The update committing part 138 selects one column (S201) and determines whether information stored in the selected column was updated (S202). If the update committing part 138 determines that the information stored in the column in the selected column was not updated (the result in S202 is No), then the update committing part 138 stores the value set in the reference-generation record in the selected column (S203). The update committing part 138 then determines whether all columns have been processed (S219).

If the update committing part 138 determines that the information stored in the column in the selected column was updated (the result in S202 is Yes), then the update committing part 138 determines the attribute in conflicting update from the committing procedure information stored in the committing procedure information database buffer 122 (S204).

The update committing part 138 then determines whether Merge is set as the attribute (S205). If the update committing part 138 determines that Merge is set as the attribute (the result in S205 is Yes), then the update committing part 138 sets a value obtained from a calculation between the updated difference and the value stored in the reference-generation record (S206). The update committing part 138 then determines whether the merge process has been carried out for all columns (S219).

If the update committing part 138 determines that Merge is not set as the attribute (the result in S205 is No), then the update committing part 138 determines whether the attribute is Max or Min (S207). If the update committing part 138 determines that the attribute is Max or Min (the result in S207 is Yes), then the update committing part 138 compares the updated value with the value in the reference-generation record and sets the maximum value or minimum value accordingly (S208). Next, the update committing part 138 determines whether the merge process has been carried out for all columns (S219).

If the update committing part 138 determines that the attribute is neither Max nor Min (the result in S207 is No), then the update committing part 138 determines whether the attribute is OverWrite (S209). If the update committing part 138 determines that the attribute is OverWrite (the result in S209 is Yes), then the update committing part 138 determines whether the commitment time in the read-out record is earlier than the commitment time in the reference-generation record (S210).

If the update committing part 138 determines that the commitment time in the reference-generation record is earlier than the commitment time in the read-out record (the result in S210 is No), then the update committing part 138 sets the read-out value (S211). Next, the update committing part 138 determines whether the merge process has been carried out for all columns (S219). If the update committing part 138 determines that the commitment time in the read-out record is earlier than the commitment time in the reference-generation record (the result in S210 is Yes), then the update committing part 138 sets the value stored in the reference-generation record (S212). Next, the update committing part 138 determines whether the merge process has been carried out for all columns (S219).

If the update committing part 138 determines that the attribute is not OverWrite (the result in S209 is No), then the update committing part 138 determines whether the attribute is Error (S213). If the update committing part 138 determines that the attribute is Error (the result in S213 is Yes), then the update committing part 138 determines whether the reference-generation record was updated (S214).

If the update committing part 138 determines that the reference-generation record was updated (the result in S214 is Yes), then the update committing part 138 cancels the transaction (S215). Next, the update committing part 138 determines whether the merge process has been carried out for all columns (S219). If the update committing part 138 determines that the reference-generation record was not updated (the result in S214 is No), then the update committing part 138 sets the value updated in the read-out record (S216). Next, the update committing part 138 determines whether the merge process has been carried out for all columns (S219).

If the update committing part 138 determines that the attribute is not Error (the result in S213 is No), then the update committing part 138 determines that the attribute is Function (S217). The update committing part 138 then reads out a user-registered function and merges the update result (S218). Next, the update committing part 138 determines whether the merge process has been carried out for all columns (S219).

If the update committing part 138 determines that all columns have not been processed (the result in S219 is No), then the update committing part 138 returns to S201 and executes subsequent processes. If the update committing part 138 determines that all columns have been processed (the result in S219 is Yes), then the update committing part 138 terminates the processing procedure.

As described above, in this embodiment, the record manipulating part 135 reads out a record from the database 123 and creates, in the database buffer 124, new data from the read-out record. When the update committing part 138 commits the record created by the record manipulating part 135, the update committing part 138 determines whether there is a record created from the same source update record. If there is a record the source update record of which is the same as the source update record of the record to be committed, the update committing part 138 commits data according to the committing procedure information stored in the committing procedure information database buffer 122. Therefore, conflicting transactions can be concurrently executed.

The database server in this embodiment stores records each of which has a plurality of data items as data and also stores committing procedure information according to which a record is committed for each data item. When updating data, therefore, the database server can commit data for each data item, so the process to update records can be efficiently executed.

When updating a record, the database server in this embodiment stores a value in an update flag for each updated data item in the record. Accordingly, the database server can determine the item including data to be committed, so the process to update records can be efficiently executed.

When updating data created from source update data, the database server in this embodiment stores a value in the generation pointer in the source update data. Therefore, the database server can determine whether there is a transaction that updates the same source update record by reading the generation pointer.

The database server in this embodiment excludes the transaction committing process but does not exclude the update process. Even if there are transactions that update the same data, therefore, the transactions do not need to undergo an exclusive wait. Thus, the database server can improve a response and throughput in case of an update conflict.

The database server in this embodiment can also be used for a process to interact with applications, so an application designer does not need to consider exclusive control of transactions in application design. Thus, the database server can reduce burdens on application designers.

A database may be replicated to create a main database system and a sub-database system. Even in this case, the database server in this embodiment can update the two systems by transmitting update logs between them.

The database server in this embodiment can also delete a synchronizing process by which exclusive control and data caching are optimized. Therefore, the synchronizing process executed in frequency communication, which has been problematic in the creation of a cloud environment, can be eliminated, so the problem with the scale-out limit can be solved. Accordingly, the database server in this disclosure can be used as part of technology that provides a database that suits to a cloud environment and can be scaled to a large size.

Third Embodiment

In addition to the embodiments described above, the database server in this disclosure may be embodied in other various forms. A third embodiment of the database server in this disclosure will be described below.

It has been described that some of the processes in the above embodiments are automatically executed and others are manually executed. However, part or all of automatically executed processes can also be manually executed and part and all of manually executed processes can also be automatically executed by a known method. Furthermore, unless otherwise noted, the processing procedures, control procedures, and specific names described above and illustrated in the drawings can be freely changed.

The database server has been described as receiving transactions that search for and update data from a user terminal, but this is not a limitation; for example, the database server may be an application server for usage. The database server has also been described as being connected to a user terminal on a one-to-one basis, but this is not a limitation; for example, the database server may be connected to a plurality of user terminals.

The log managing part 139 has been described as collecting logs and storing them in the log database 125, but this is not a limitation; for example, instead of recording logs, the log managing part 139 may permanently retain the contents of the database buffer in the database in synchronization with the termination of a transaction to assure the permanence of the database.

The data manipulating part 134 has been described as notifying the record manipulating part 135 which committed data, a transaction start time or a data manipulating instruction execution time, is searched for, but this is not a limitation; for example, the data manipulating part 134 may code information about a search time in an SQL statement together with an access procedure and may transfer the SQL statement to the record manipulating part 135.

The record manipulating part 135 has also been described as setting a time at which the transaction is terminated as the commitment time during a data search, but this is not a limitation; for example, the record manipulating part 135 may set a time when a transaction is started during a data search.

To concurrently execute transactions that update the same record, the record manipulating part 135 changes a condition according to which a read-out generation is determined to be valid or invalid for a transaction under conventional transaction under multi-version concurrency control (MVCC). The record manipulating part 135 changes "the updater ID of the record is not yet set", which is one of the conventional determination conditions to "the updater ID of the record is not yet set and the record is not the source update record".

FIG. 12 illustrates record IDs for each transaction that were determined to be visible by the record manipulating part 135. For easy understanding, it is assumed that the transaction ID assigned to a next transaction during snapshot acquisition is 100. As illustrated in FIG. 12, if the record set in FIG. 6 is being processed for a snapshot, for example, the record manipulating part 135 determines that, for the transaction identified by a transaction ID of 40, the records identified by record IDs of R1, R4, R5, and R6 are visible. For the transaction identified by a transaction ID of 50, the record manipulating part 135 determines that the records identified by record IDs of R1, R5, R7, R8, and R9 are visible.

The update committing part 138 has been described as selecting columns one at a time and carrying out a merge process in the order in which columns were selected, but this is not a limitation; for example, the update committing part 138 may concurrently carry out merge processes for a plurality of columns. Furthermore, the update committing part 138 can select columns in any order. Any of the processes in S205, S207, S209, and S213 illustrated in FIG. 11 may be carried out first.

The illustrated information stored in the storage unit is just an example; information does not necessarily have to be stored as illustrated. For example, the database 123 may store transaction start times.

The illustrated constituting components are conceptually represented from the viewpoint of functions, and do not necessarily have to be physically arranged as illustrated. In the database server 100, for example, the data manipulating part 134 and record manipulating part 135 may be combined together. All or any part of processing functions executed in each unit can be implemented by a CPU and a program interpreted executed by the CPU, or can be implemented as wired-logic hardware.

By the way, the processes described in the above embodiments can be implemented by executing a pre-stored program on a personal computer, a workstation, or another computer system. An example of a computer system that executes a program having functions as in the embodiments described above will be described below.

Figure 13:
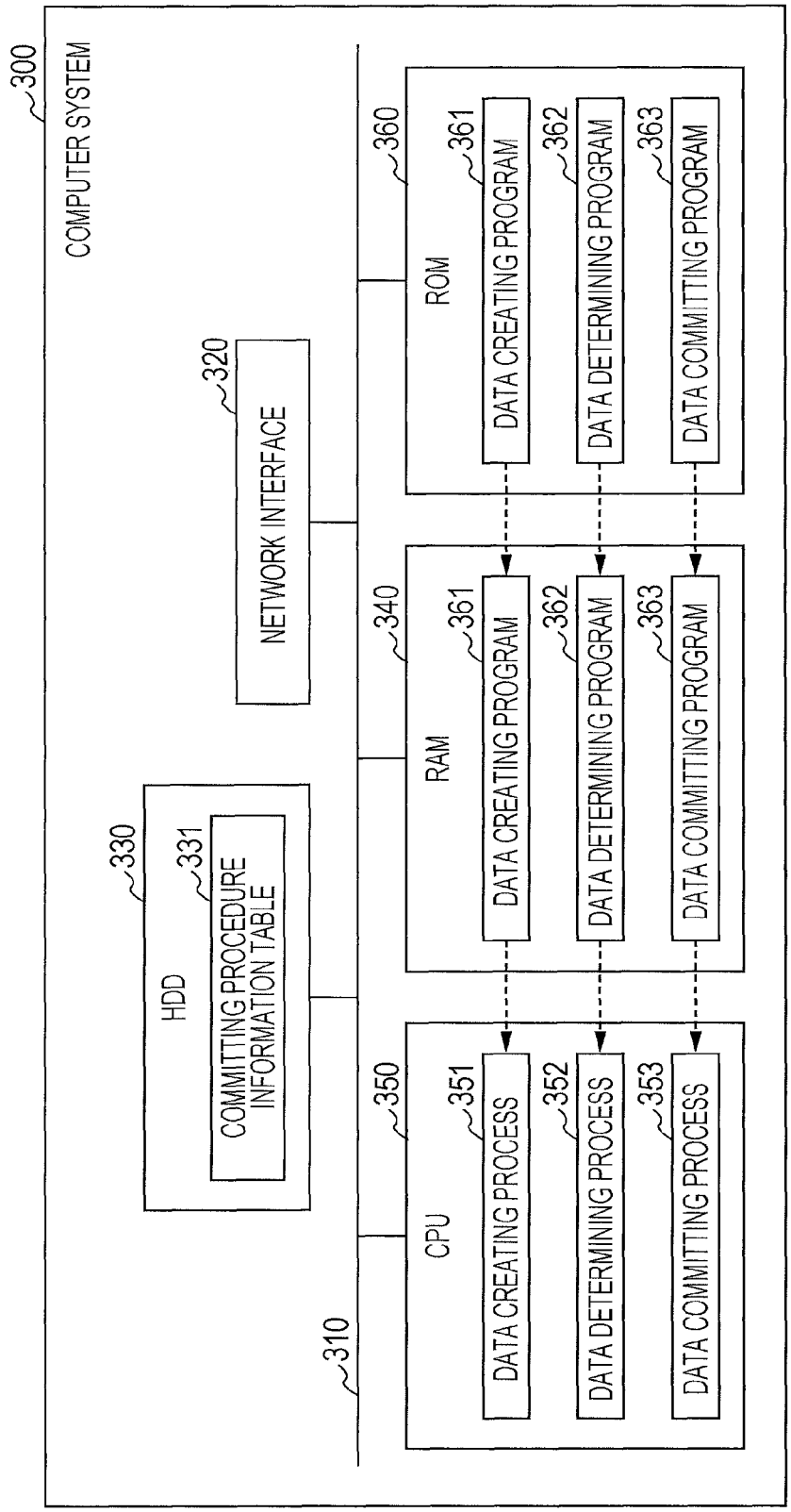
FIG. 13 illustrates a computer system that executes a database update program.

FIG. 13 illustrates a computer system that executes a database update program. The computer system 300 in FIG. 13 has a bus 310, a network interface 320, a hard disk drive (HDD) 330, a random access memory (RAM) 340, a CPU 350, and a read-only memory (ROM) 360. The network interface 320 corresponds to the communication control interface 110 in FIG. 2.

Programs that provide functions as described in the above embodiments are pre-stored in the ROM 360. Specifically, as illustrated in FIG. 13, a data creating program 361, a data determining program 362, and a data committing program 363 are pre-stored in the ROM 360.

The CPU 350 reads out the data creating program 361, data determining program 362, and data committing program 363 and stores them in the RAM 340. The CPU 350 executes the data creating program 361 as a data creating process 351, executes the data determining program 362 as a data determining process 352, and executes the data committing program 363 as a data committing process 353. The data creating process 351 corresponds to the record manipulating part 135 in FIG. 2. The data determining process 352 and data committing process 353 correspond to the update committing part 138. The HDD 330 includes a committing procedure information table 331 corresponding to the committing procedure information database 121 in FIG. 2.

The programs 361 to 363 do not necessarily have to be pre-stored in the ROM 360. For example, these programs may be pre-stored on a flexible disc (FD), a compact disc read-only memory (CD-ROM), a magneto-optical (MO) disc, a digital versatile disc (DVD), an integrated circuit (IC) card, or another transportable physical medium that can be inserted into the computer system 300. Alternatively, the programs may be pre-stored on a hard disk (HD) or another fixed physical medium disposed inside or outside the computer system 300. Furthermore, the programs may be pre-stored in another computer connected to the computer system 300 through a public line, the Internet, a local area network (LAN), a wide area network (WAN), or the like. Then, the computer system 300 may read out the programs from the other computer and may execute them.

That is, these programs are stored on a portable physical medium, fixed physical medium, communication medium, or the like as described above, in a computer-readable form. When the computer system 300 reads out these programs from the storage medium and executes them, functions as in the embodiments described above are implemented. The program in the other embodiments is not limited to a program executed by the computer system 300. When, for example, another computer system or server executes a program or another computer and a server cooperate to execute a program, this disclosure can also be applied in the same way.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A database server apparatus comprising:
   a data storage unit configured to store data;
   a committing procedure information storage unit configured to store committing procedure information for committing each of a plurality of transactions that updates data stored in the data storage unit;
   a data creating unit configured to create yet-to-be-committed update data from the stored data by executing a transaction for updating the data upon receipt of the transaction;
   a determining unit configured to determine whether there is another transaction that has source data which matches data of a transaction that is yet to be committed; and
   a committing unit configured to re-update the yet-to-be-committed update data and commit the transaction that is yet to be committed using the committing procedure information, when the determining unit determines that the data of the transaction that is yet to be committed matches the source data of the another transaction, and
   wherein the committing unit uses the source data to determine whether the another transaction is to update a same record as indicated in the source data.

2. The database server apparatus according to claim 1, wherein the data storage unit stores a record having a plurality of data items as the data, the committing procedure information storage unit stores the committing procedure information for each of the plurality of data items, the data creating unit creates a yet-to-be-committed update record in which the data item was updated by executing a transaction that updates the record upon receipt of the transaction, the determining unit determines whether there is a committed transaction that created a committed record as a source update record, and when the determining unit determines that there is the committed transaction, the committing unit commits the transaction for re-updating each data item in the yet-to-be-committed update record according to the committed record and the committing procedure information.

3. The database server apparatus according to claim 2, wherein the record stored in the data storage unit includes identifying information that identifies the committed record created as the source update record, and the determining unit determines whether there is a committed transaction for creating the committed record in accordance with the identifying information included in the record, when the transaction executed by the data creating unit is committed.

4. The database server apparatus according to claim 2, wherein the record stored in the data storage unit includes an update flag, for the each of the plurality of data items, that indicates whether the data item was updated, and when the determining unit determines that there is a committed transaction that created a committed record as the source update record, the committing unit identifies an updated data item according to the update flag, re-updates the identified data item in accordance with the committed record and the committing procedure information, and commits the transaction.

5. The database server apparatus according to claim 2, wherein the committing unit excludes another transaction in relation to committed data by which the transaction is committed when the transaction is committed, and cancels the exclusion of the other transaction in relation to the committed data after the transaction has been committed.

6. A method for updating a database by a computer, method comprising:
   creating yet-to-be-committed update data from data by executing a transaction that updates the data upon receipt of the transaction;
   determining whether there is another transaction that has source data which matches data of a transaction that is yet to be committed; and
   re-updating the yet-to-be-committed update data and commit the transaction that is yet to be committed using the committing procedure information, when the data of the transaction that is yet to be committed matches the source data of the another transaction, and
   wherein the committing unit uses the source data to determine whether the another transaction is to update a same record as indicated in the source data.

7. A computer-readable, non-transitory medium storing a database update program causing a computer to execute a process, the process comprising:
   creating yet-to-be-committed update data from data by executing a transaction that updates the data upon receipt of the transaction;
   determining whether there is another transaction that has source data which matches data of a transaction that is yet to be committed; and
   committing the transaction by re-updating the yet-to-be-committed update data and commit the transaction that is yet to be committed using the committing procedure information, when the determining unit determines that the data of the transaction that is yet to be committed matches the source data of the another transaction, and
   wherein the committing unit uses the source data to determine whether the another transaction is to update a same record as indicated in the source data.

8. A database server apparatus that stores data in a data storage unit, the database server apparatus comprising:
   a processor configured to execute a procedure, the procedure comprising:
   storing committing procedure information for committing each of a plurality of transactions that updates data stored in the data storage unit;
   creating yet-to-be-committed update data from the stored data by executing a transaction for updating the data upon receipt of the transaction;
   determining whether there is a committed transaction for creating committed data as updating source data; and re-updating the yet-to-be-committed update data to correspond with the committed data and committing the transaction by which a plurality of transactions are committed using committing procedure information when presence of a committed transaction that created committed data as updating source data is determined in the determining, and wherein the committing unit uses the source data to determine whether the another transaction is to update a same record as indicated in the source data.

9. The database server apparatus according to claim 1, wherein each of the plurality of transactions is selected from a group of processes consisting of searching, adding, updating, and deleting the data stored in the data storage unit.

* * * * *